US007918630B2

(12) United States Patent
Barnes

(10) Patent No.: US 7,918,630 B2
(45) Date of Patent: Apr. 5, 2011

(54) MATERIAL CUTTING MACHINE AND METHOD

(76) Inventor: Austen B. Barnes, Queensville (CA)

( * ) Notice: Subject to any disclaimer, the term of this patent is extended or adjusted under 35 U.S.C. 154(b) by 837 days.

(21) Appl. No.: 11/839,157

(22) Filed: Aug. 15, 2007

(65) Prior Publication Data

US 2009/0047087 A1 Feb. 19, 2009

(51) Int. Cl.
*B23D 79/02* (2006.01)
*B23D 79/06* (2006.01)

(52) U.S. Cl. ........ 409/303; 409/298; 409/296; 409/330; 409/339; 409/289; 83/542; 83/582; 83/428; 83/433

(58) Field of Classification Search .................. 409/298, 409/297, 301, 303, 296, 326, 330, 331, 348, 409/338–339, 289, 138, 139–140, 141, 201, 409/211, 216; 83/542, 582, 543, 568, 74, 83/72, 428, 433; *B23D 79/02, 79/06*
See application file for complete search history.

(56) References Cited

U.S. PATENT DOCUMENTS

| | | | | |
|---|---|---|---|---|
| 4,026,199 | A | 5/1977 | Adams et al. | |
| 4,312,255 | A * | 1/1982 | Holmstrom | 83/582 |
| 4,380,945 | A | 4/1983 | Guild et al. | |
| 4,637,775 | A * | 1/1987 | Kato | 409/138 |
| 4,860,500 | A * | 8/1989 | Thompson | 409/138 |
| 4,884,941 | A * | 12/1989 | Kazerooni | 414/744.5 |
| 5,159,865 | A | 11/1992 | Hinckley | |
| 5,477,721 | A * | 12/1995 | Barnes | 409/298 |
| 5,752,402 | A | 5/1998 | Barnes | |
| 5,761,947 | A * | 6/1998 | Barnes | 409/298 |
| 5,765,975 | A * | 6/1998 | Hoffmann et al. | 409/138 |
| 5,931,071 | A * | 8/1999 | Mori | 83/582 |
| 2005/0031428 | A1* | 2/2005 | Bo | 409/201 |

FOREIGN PATENT DOCUMENTS

| | | | |
|---|---|---|---|
| DE | 4239344 | A1 * | 6/1993 |
| EP | 0377484 | A2 | 7/1990 |

OTHER PUBLICATIONS

Machine Translation of DE-4239344-A1, which DE '344 was published in Jun. 1993.*

* cited by examiner

*Primary Examiner* — Erica E Cadugan

(57) ABSTRACT

A material cutting machine has a tool mount support mounted for reciprocal movement and a tool mount supported by the tool mount support. A driver, such as a pneumatic cylinder, selectively advances and retracts the tool mount support. A control system is operatively coupled to the driver for setting the advancement force of the tool mount support when a tool supported by said tool mount contacts a workpiece, such as the edge or surface of a moving strip. In this way, the depth of cut of the tool is controlled by tool advancement force rather than by accurate positioning of the tool. In one embodiment, the tool mount support may have a head and a base and a resilient member resiliently coupling the head to the base to provide a damped resilience. With this embodiment, a transient spike in the reaction force which may result, for example, from a hard spot in the material, causes the tool to momentarily deflect. Swing links may maintain the lateral positioning of the tool whenever it momentarily retreats due to a reaction force spike. A guide for the tool mount may be pivotably mounted to a frame so that a rake angle of a tool supported by the tool mount may be varied.

16 Claims, 4 Drawing Sheets

MATERIAL CUTTING MACHINE AND METHOD

BACKGROUND

Existing metal or plastic skiving or scarfing machines are widely used for finishing edges or surfaces of continuous strip or cut strip materials. The material is moved axially along a guided path past one or more stationary tools which cut or shave swarf off the material to expose the finished edge profile or surface.

Typically, with conventional machines, a rake angle for a tool is pre-set prior to running and then the tool's position relative to the material is adjusted using machine precision slides to set the cutting depth. The rake angle for the tool enables cutting to a required depth without excessive tendency of the tool to dig into the material.

The stability of cutting in conventional machines is dependant upon the accuracy of guiding the material while being subjected to tool loading, the accuracy of tool positioning, the rake angle, and the stiffness of the mechanical system supporting the material relative to the tool. The tool positioning slide is customarily a precision screwjack unit with zero backlash and high rigidity. Because of the difficulty of maintaining high consistent accuracy of material and tool engagement, tools tend to cut with some chatter present, digging in and then releasing the material in a cyclic wave. This spoils the material finish. Any change in position of the tool or its mounts because of vibration instantly changes the cut, frequently resulting in sustained oscillation. If the material has a side curvature or camber, the problem is exacerbated as it is difficult to keep the material in a constant path as it is linearly pulled, not only due to the material's curvature but also due to distortion of the material as it is pulled linearly.

Any adjustment of the cut in a leading cutting station in such an arrangement results in the need to readjust all of the following stations.

SUMMARY

A material cutting machine has a tool mount support mounted for reciprocal movement and a tool mount supported by the tool mount support. A driver, such as a pneumatic cylinder, selectively advances and retracts the tool mount support. A control system is operatively coupled to the driver for setting the advancement force of the tool mount support when a tool supported by said tool mount contacts a workpiece, such as the edge or surface of a moving strip. In this way, the depth of cut of the tool is controlled by tool advancement force rather than by accurate positioning of the tool. In one embodiment, the tool mount support may have a head and a base and a resilient member resiliently coupling the head to the base to provide a damped resilience. With this embodiment, a transient spike in the reaction force which may result, for example, from a hard spot in the material, causes the tool to momentarily deflect. Swing links may maintain the lateral positioning of the tool whenever it momentarily retreats due to a reaction force spike. A guide for the tool mount may be pivotably mounted to a frame so that a rake angle of a tool supported by the tool mount may be varied.

With the subject invention, the material no longer requires highly accurate guiding and the tools no longer require accurate positioning, as the tools engage the material by adjustable force, riding on the material edge, not by pre adjusted position. Therefore, the precision slide mechanism of known machines may be replaced by, for example, a pneumatic cylinder.

In accordance with the present invention, there is provided a material cutting machine, comprising: a tool mount support mounted for reciprocal movement; a tool mount supported by said tool mount support; a driver for selectively advancing and retracting said tool mount support; and a control system operatively coupled to said driver for setting advancement force of said tool mount support when a tool supported by said tool mount contacts a workpiece.

The tool mount support may have a head and a base and a resilient member resiliently coupling the head to the base. The driver may comprise a cylinder, such as a pneumatic cylinder, with a piston driven by pressure of a compressible fluid in said cylinder. The cylinder may be double acting. The control system may comprise a pressure regulator coupled through a fluid line to the cylinder.

At least one link arm may be pivoted to the head of the tool mount support and pivoted to the base of the tool mount. The at least one link arm may comprise a pair of link arms forming, with said tool mount support head and the tool mount support base, a collapsible parallelogram. The at least one link arm may comprise two pairs of link arms, each pair forming, with the tool mount support head and the tool mount support base, a collapsible parallelogram. The resilient member may comprise a resilient pad.

The machine may further comprise a frame and a guide for the tool mount support base pivotably mounted to the frame so that a rake angle of a tool supported by said tool mount varies with a pivot angle of said mount. The machine may further comprise a rake angle drive for setting a pivot angle of the guide. A sensor may be provided for sensing a pivot angle of the guide. The rake angle drive may comprise a motor geared to a geared section of the mount.

The tool mount support head may comprise a pair of jaws for clamping said tool mount.

The machine may further comprise a vibrator coupled between the tool mount support head and the resilient member for vibrating the tool mount support head in a direction parallel to a direction of a cut.

In another aspect, there is provided a method of scarfing or skiving a workpiece comprising: contacting said workpiece with a cutting tool with a pre-selected force while moving said workpiece relative to said tool.

The method may further comprise providing the cutting tool with a degree of compliance in a direction toward and away from the workpiece. And the method may further comprise remotely adjusting a rake angle of the tool.

Other features and advantages will be apparent from the following description in conjunction with the drawings.

BRIEF DESCRIPTION OF THE FIGURES

In the figures which illustrate example embodiments of the invention.

DETAILED DESCRIPTION OF EXEMPLARY EMBODIMENTS

In overview, rather than setting a cutting depth of a tool, the advancement force (or pressure) of the tool is set. Further, the cutting force axis may be decoupled, or offset from the actual tool engagement point axis, typically by a few centimeters, using an offset resiliently cushioned assembly. This may conveniently take the form of a mini tiltable parallelogram frame backed by a resilient pad coupling the tool mount and the tool mount support. This arrangement avoids an instant change in the cutting force consequent on a small change of position of the material relative to the tool and thereby removes the main source of chatter triggering present in conventional skiving machines.

Additionally, with the subject machines, the angle of rake may be infinitely variable either locally or remotely. Rake angle affects the depth of cut and the tendency to chatter at certain settings. The accurate varying of rake angle enables the system to be "tuned out" of a "chafter prone" operating mode. The variation of cutting pressure or tool loading pressure and rake angle as the system is running may enable complete elimination of chatter.

The subject machine is therefore resistant to instant cutting changes due to material width or thickness changes, changes in slitting quality or burr height, minor edge defects, a blunted tool, etc.

Besides the chatter causing parameters described above, material such as badly slit stainless steels can contain inclusions of hard sections embedded in the material. When these hard inclusions hit the tool, the shock load induces "grabbing" of the material by the tool, and typically initiates chatter. The subject cutting machines are transient resistant, and capable of still maintaining a smooth cut under these conditions, once adjusted.

Because each tool contacts the material at all times with a pre-set force (or pressure), the material can change in width or thickness slightly without changing the cut. Also, changing the cut of a leading tool in a cascaded sequence of stations, does not upset the individual cut depth settings of downstream stations: all continue cutting as set, without the downstream machines needing resetting after an upstream change.

A quick change mechanism may be provided for the tool mount.

Figure 1:
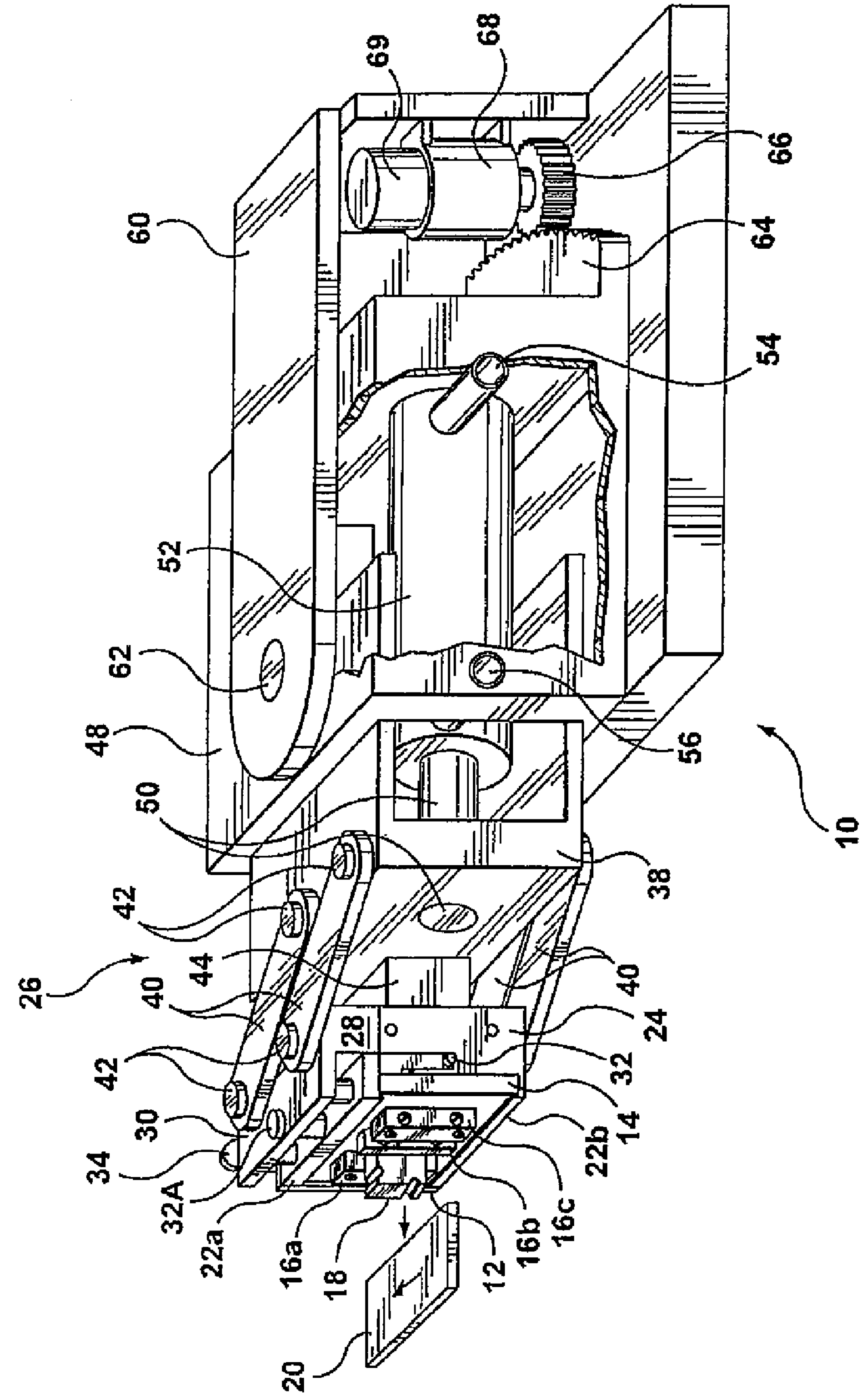
FIG. 1 is a perspective view of a machine embodying aspects of the subject invention.

A example embodiment of a machine incorporating principles of the subject invention is shown in FIG. 1.

Turning to FIG. 1, a material cutting machine 10 has a tool mount 12 with a back plate 14 and clamping blocks 16*a*, 16*b*, 16*c*. A tool 18 for cutting a continuous strip or cut strip material 20 is mounted between clamping blocks 16*a*, 16*b*.

The back plate 14 of the tool mount 12 is clamped between an upper spring loaded jaw 22*a* and lower fixed jaw 22*b* of the head 24 of a tool mount support 26. The lower fixed jaw 22*b* extends from a head block 28 as does an opposed arm 30. A guide pin 32A is force fit in the upper jaw 22*a* and makes a sliding fit in arm 30 to guide movement of the upper jaw. A cam shaft 32 extends between upper jaw 22*a* and head block 28 such that by rotating the cam shaft with lever 34, upper jaw 22*a* is lifted and releases tool mount 12. The latter can then be slid out and replaced.

The head 24 of the tool mount support 26 is joined to a slider 38 of the tool mount support 26 by four swinglinks 40, each of which is pivotably mounted at one end to the head block 28 by a shoulder bolt 42 and at an opposite end to the tool mount support slider 38 by a further shoulder bolt 42. A resilient pad 44, or telescoping cylinder/friction pad combination, is attached between the front face of slider 38 and the rear face of head 24 providing a controlled resilience padding, damping head 24 as it swings on the parallelogram formed by the swinglinks. As a result, tool mount 12 is therefore able to deflect toward slider 38 while remaining parallel to the direction of material travel.

The slider 38 of tool head support 26 is slidably received by a guide 48 and is fixed to the piston 50 of a double acting cylinder 52 fixed to the guide. The cylinder has an extension port 54 and a retraction port 56. In consequence, the slider 38, and hence the tool mount support 26, is mounted for reciprocal movement.

Guide 48 is swing mounted to a frame 60 by swing fulcrum pins 62. The end of the guide is formed with a partial gear 64 which meshes with a pinion gear 66 mounted to the output shaft of a motor 68 fixed to frame 60. This provides a variable tool insert rake angle which may be indicated by a position transducer 69 on the motor 68. As will be apparent to those skilled in the art, rather than using the described gear arrangement to provide the rake angle, other mechanisms such as screwjacks, levers, or cams may be used to achieve a controlled variable rake angle.

Figure 2:
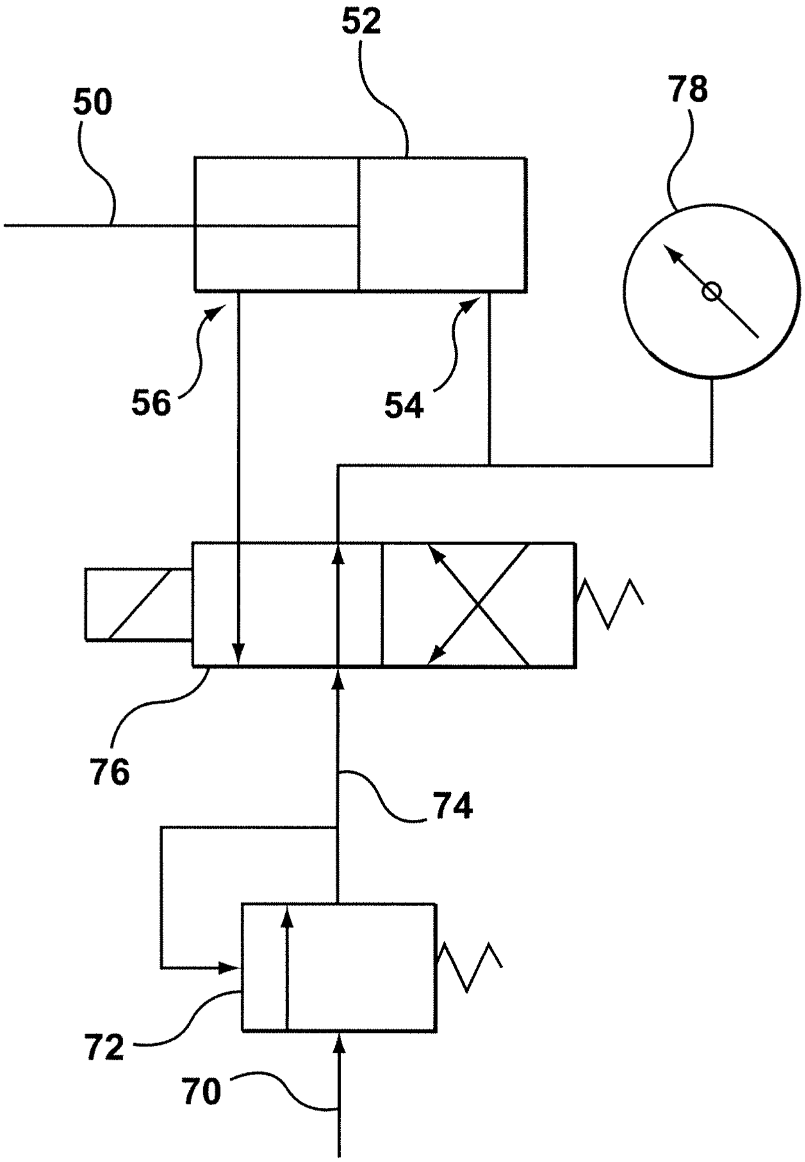
FIG. 2 is a schematic diagram of a driver of the machine of FIG. 1 and a control system for the driver.

Referencing FIG. 2, pressurised air is supplied at inlet line 70. This inlet air is selectively throttled by pressure regulator 72 in order to supply a selected pressure at line 74. The pressure in line 74 is selectively communicated to one of extension port 54 or retraction port 56 of cylinder 52 by four-way air valve 76 while the other port is exhausted. A transducer or gauge 78 provides pressure monitoring, Thus, a tool 18 may be retracted by communicating pressurised air to retraction port 56 and the tool may be pressure loaded forward by communicating pressurised air to the extension port 54 of cylinder 18.

Figure 3:
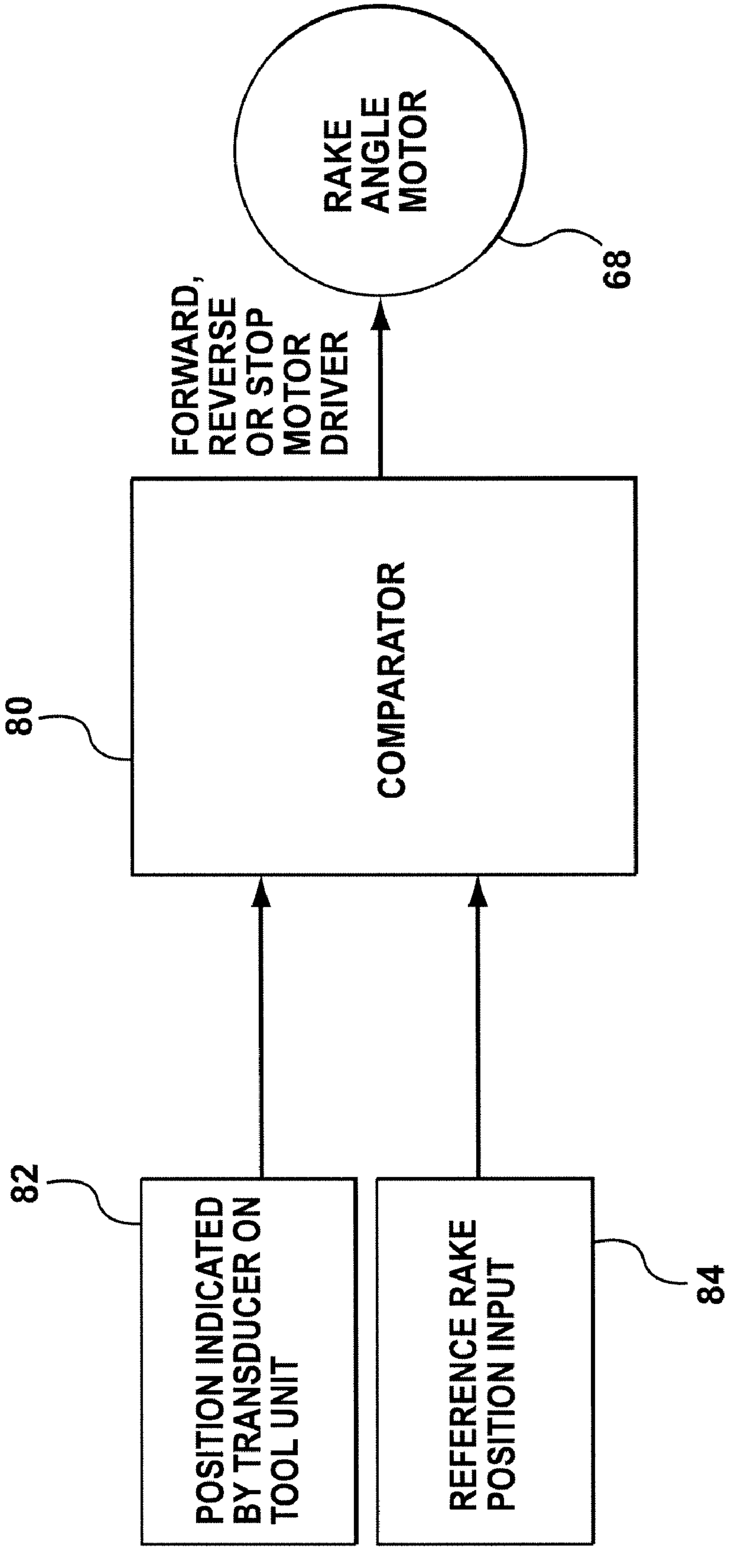
FIG. 3 is a schematic view of a rake angle control system for the machine of FIG. 1.

Turning to FIG. 3, the output 82 of the position transducer 69 (FIG. 1) inputs a comparator 80 as does a reference rake position input 84 set by an operator. The comparator sends control signals to the rake angle motor 68 based on these inputs in order to set the rake angle at the selected angle. The position transducer can be rotary as shown in FIG. 1, or a linear unit mounted on guide 48. As will be apparent to those skilled in the art, rather than using a comparator to control the rake angle, a controller could be employed to set pre-selected rake angles.

Where the material moves too slowly relative to the tool to achieve proper cutting (as, for example, in edge preparation of strip entering tube mills equipped with laser seam welders), the tools can be vibrated to achieve high linear speed relative to the material. This may be accomplished by using the arrangement shown in FIG. 4.

Figure 4:
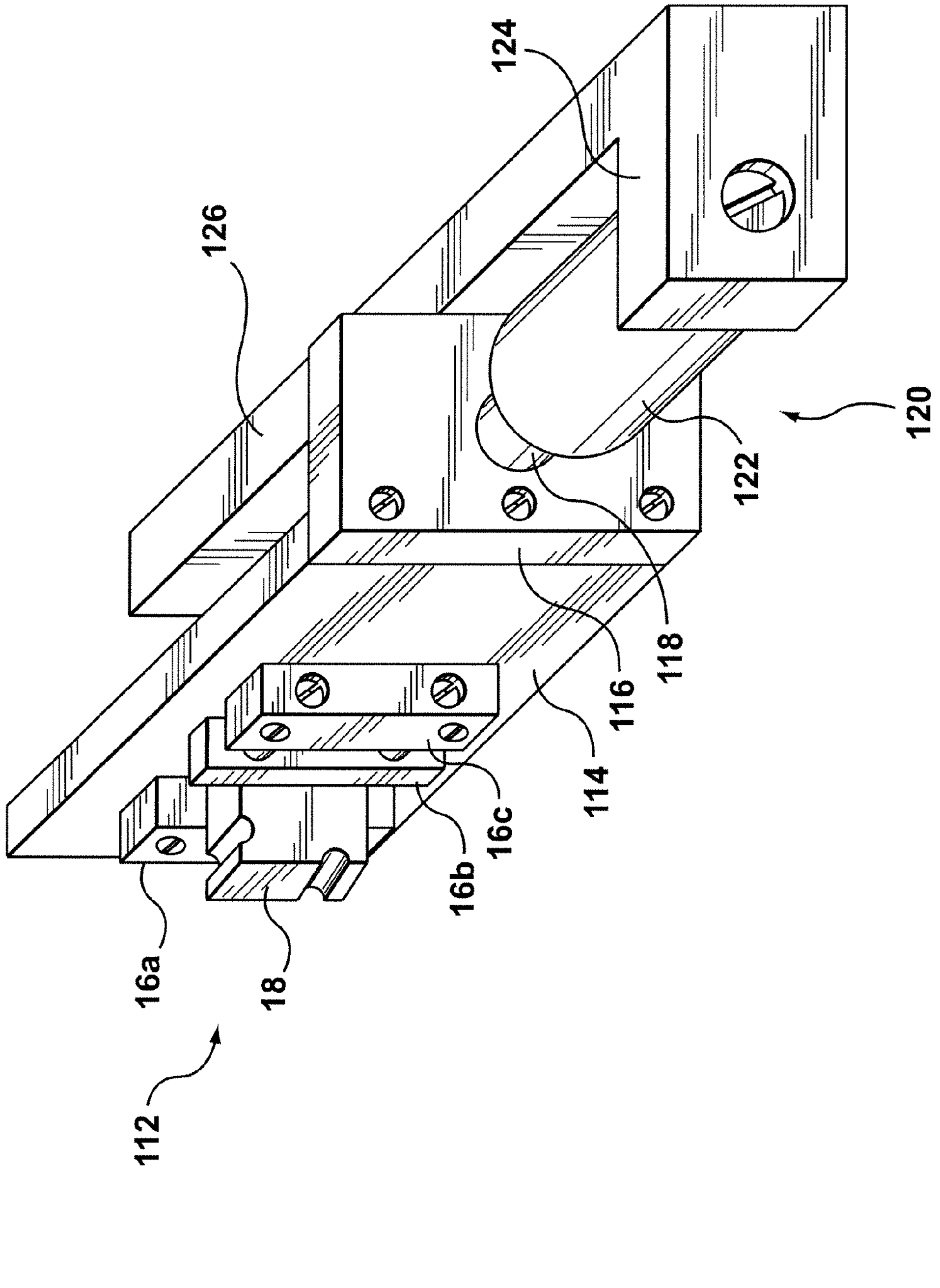
FIG. 4 is a perspective view of a portion of a cutting machine embodying an alternate aspect of the subject invention.

Turning to FIG. 4, tool mount 112 is identical to tool mount 12 of FIG. 1 except that the back plate 114 of tool mount 112 is affixed to a driver plate 116 of a vibratory unit 120. The driver plate 116 is, in turn, is attached to an axially driven output shaft 118 of an actuator 122, which can be magnetostrictive or piezo electric or even pneumatic or electromagnetic. The actuator 122 is attached to a reaction bracket 124 integral with a tongue shaped section 126. The tongue section 126 bolts to the back of head block 28 in FIG. 1 and abuts resilient pad 44. By actuating actuator 120, tool 18 will be vibrated in a direction parallel to the direction of movement of the material to be cut.

Optionally, frame 60 may be mounted to a motorized carriage (not shown) and sensors (not shown) may be provided to allow the material cutting machine 10 to be advanced in order to provide coarse tool engagement.

In operation, an operator may input a selected rake angle, activate a coarse tool engagement function, then select an operating pressure (using pressure regulator 72). Next, by switching four-way switch 76 to couple this pressure to the extension port 54 of cylinder 52, the tool is advanced toward the material 20 to be cut with an advancement force dependent upon the selected pressure. If the relative speed of the tool with respect to the material is not sufficiently high, the machine 10 may be fitted with the vibratory unit 120. If the tool 18 encounters a transient anomaly in the material 20 which increases the reaction force of the material, the tool may momentarily retract to balance this reaction force due to the resilient provided by pad 44 while remaining properly aligned with the material, due to swinglinks 40.

Various different mechanical and electrical arrangements of the components are possible to achieve infinitely variable advancement force on the tool, a certain degree of resilient of the tool, and/or infinitely variable and accurately pre-settable remotely controlled rake angle over the operating range of the tool.

For example, the pneumatic cylinder 52 could be replaced with a linear motor supplying a selectable advancement/retraction force dependent upon the voltage supplied to the linear motor.

Other modifications will be apparent to those skilled in the art and, therefore, the invention is defined in the claims.

What is claimed is:

1. A material cutting machine, comprising:

a tool mount support mounted for reciprocal movement;

a tool mount supported by said tool mount support;

a driver for selectively advancing and retracting said tool mount support;

a control system operatively coupled to said driver for setting advancement force of said tool mount support when a tool supported by said tool mount contacts a workpiece, and wherein said tool mount support has a head and a base and a resilient member resiliently coupling said head to said base, said resilient member comprising a resilient pad.

2. The machine of claim 1 wherein said base is coupled to a piston.

3. The machine of claim 1 wherein said driver comprises a cylinder with a piston driven by pressure of a compressible fluid in said cylinder.

4. The machine of claim 3 wherein said cylinder is a pneumatic cylinder.

5. The machine of claim 4 wherein said pneumatic cylinder is a double acting cylinder.

6. The machine of claim 3 wherein said control system comprises a pressure regulator coupled through a fluid line to said cylinder.

7. The machine of claim 1 further comprising at least one link arm pivoted to said head of said tool mount support and pivoted to said base of said tool mount support.

8. The machine of claim 7 wherein said at least one link arm comprises a pair of link arms forming, with said tool mount support head and said tool mount support base, a collapsible parallelogram.

9. The machine of claim 7 wherein said at least one link arm comprises two pairs of link arms, each pair forming, with said tool mount support head and said tool mount support base, a collapsible parallelogram.

10. The machine of claim 7 wherein said resilient pad is configured for damping said head of said tool mount support as said head of said tool mount support pivots via said at least one link arm.

11. The machine of claim 1 further comprising:

a frame;

a guide for said tool mount support base pivotably mounted to said frame so that a rake angle of the tool supported by said tool mount varies with a pivot angle of said mount.

12. The machine of claim 11 further comprising a rake angle drive for setting a pivot angle of said guide.

13. The machine of claim 12 further comprising a sensor for sensing a pivot angle of said guide.

14. The machine of claim 13 wherein said rake angle drive comprises a motor geared to a geared section of said guide.

15. The machine of claim 1 wherein said tool mount support head comprises a pair of jaws for clamping said tool mount.

16. The machine of claim 1 further comprising a vibrator coupled between said tool mount support head and said tool mount for vibrating said tool mount in a direction parallel to a direction of a cut.

* * * * *